Sept. 5, 1950        H. F. KELLER        2,521,226
ELECTRIC CORD REEL
Filed Sept. 7, 1946
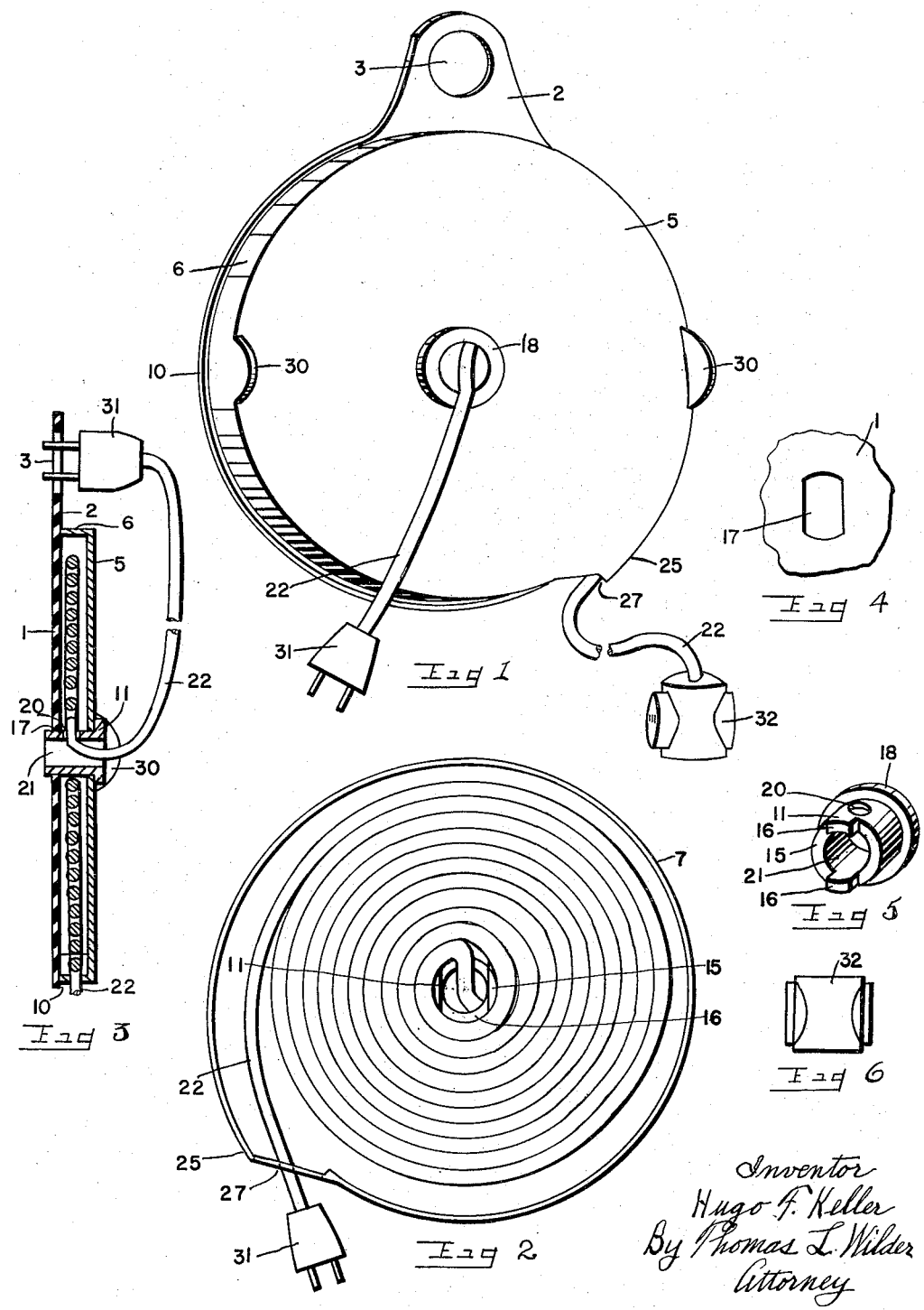

Patented Sept. 5, 1950

2,521,226

UNITED STATES PATENT OFFICE 2,521,226

ELECTRIC CORD REEL

Hugo F. Keller, Oneida, N. Y.

Application September 7, 1946, Serial No. 695,468

4 Claims. (Cl. 242—97)

My invention relates to an electric cord reel and I declare the following to be a full, concise and exact description thereof sufficient to enable anyone skilled in the art to which it appertains to make and use the same, reference being had to the drawings in which like reference characters refer to like parts throughout the specification.

The object of the invention is to provide a simplified reel for use in holding an electric cable in such manner that it can be extended at either end to reach its desired location.

Furthermore, the reel can be suspended from the wall outlet socket without the use of any special built in prongs for plugging into a socket. It can be used in connection with floor plugs regardless of location.

Moreover, the reel holds the cord in such manner that either end of the electric cord is free to be pulled out to reach the desired socket.

The object will be understood by referring to the drawings in which:

Fig. 1 is a perspective view of the device.

Fig. 2 is a detail view showing the interior of the cord holding member used with other parts.

Fig. 3 is a central vertical section of the device.

Fig. 4 is a detail view showing the back surface of a disk employed.

Fig. 5 is a detail view enlarged showing a hub member employed in the device.

Fig. 6 is a detail view of a female socket employed.

Referring more particularly to the drawings, the device embodies a disk 1 made of any suitable non-conductive material such as Bakelite. It forms the back of the reel. A projecting part 2 having an aperture 3 formed therein is made integral with disk 1 for holding the reel to a peg or to the wall socket, not shown. Furthermore aperture 3 will allow for the application of a finger of a person's hand when winding the reel.

A partially round cover 5 is disposed with its edge against the inner surface of disk 1 although free to rotate relative to said disk 1 when winding the reel. The cover 5 has a lateral wall 6. The edge 7 of said wall 6 abuts, as above stated, against the inner surface of disk 1 and slides thereover when cover 5 is rotated. A marginal edge 10 of disk 1 projects slightly beyond the lateral wall 6 of cover 5, whereby to allow said disk 1 to be held stationary by one hand while cover 5 is turned with the other.

The means for holding disk 1 to cover 5 embodies a hollow hub 11 located approximately in the center of disk 1 and of cover 5. The outer end of hub 11 is reduced at 15 to form angled protruding members 16, 16 which cooperate with an oblonged shaped aperture 17 made in the central portion of disk 1. Members 16, 16 will project through disk 1 at opening 17 with a tight fit, whereby to hold said disk 1 rigidly to cover 5 and also to compel hub 11 to be held stationary with disk 1 when cover 5 rotates to wind the reel. The opposite end of hub 5 has formed integral therewith a flange 18 that engages the outer surface of cover 5, loosely to allow for rotation of cover 5.

Said hub 11 has an aperture 20 formed therein at right angles to its central conduit 21 for the threading of electric cord 22 down therethrough and out through conduit 21.

Cover 5 and its corresponding part of disk 1 is enlarged in circumference at 25 to accommodate the exit from the periphery of cover 5 of the electric cable or cord 22. To this end an opening 27 is made in the lateral wall 6 of cover 5.

The means to aid in rotating cover 5 relative to disk 1 contemplates two upstanding ears 30, 30 formed integral therewith and at diametrically opposite positions adjacent the lateral wall 6 of cover 5.

The operation of the reel is effected by first removing disk 1 from cover 5. This can be done by gently forcing disk 1 from members 16, 16 and then threading the electric cable 22 through opening 20 and out through conduit 21. Disk 1 is then replaced in position. An electric plug 31 is fastened to the end of cable 22 at one end. A female socket 32 is fastened to the other free end of cable 22.

Cable 22 can be wound now upon hub 11 by turning cover 5 relative to disk 1. This operation will be facilitated by placing one finger through opening 3 of part 2 and holding ears 30, 30 with the fingers of the other hand. Either end of cable 22 can be pulled out at will to reach the desired location for plug 31 or socket 32. When not in use the reel can be suspended by hanging upon a wall socket and plug 31 placed through aperture 3 as shown in Fig. 3.

Having thus described my invention what I claim as new and desire to secure by Letters Patent is as follows:

1. In an electric cord reel, a disk having a projection with a finger hole therein, a cover rotatably mounted relative to said disk, a hub mounted to said disk, a chamber formed between said disk and cover for holding an electric cord, said hub and cover having apertures formed therein to allow for the threading of said electric cord therethrough, and ears formed on said cover, whereby to aid in turning same relative to said disk.

2. In an electric cord reel, a disk having a protruding portion with an aperture therein, a cover having a lateral wall mounted to rotate relative to said disk, a chamber formed by said cover for storing an electric cord, a hub mounted to said disk for supporting said cover in a rotatable manner, said hub and disk having apertures for the stringing of said electric cord therethrough, and ears formed on said cover and cooperating with the protruding portion on said disk to aid in rotating said cover to wind the electric cord on said hub.

3. In an electric cord reel, a disk having a protruding portion with an aperture therein, a cover having a lateral wall mounted to rotate relative to said disk, a chamber formed by said cover for storing an electric cord, a hub mounted to said disk for supporting said cover in a rotatable manner, said hub and disk having apertures for the stringing of said electric cord therethrough, and outstanding ears formed on the periphery of said cover and cooperating with the protruding portion on said disk to aid in rotating said cover to wind the electric cord on said hub.

4. In an electric cord reel, a disk having a protruding portion with a finger aperture therein, whereby to hold said reel, a cover having a lateral wall mounted to rotate relative to said disk, a chamber formed by said cover for storing an electric cord, said disk having an oblong shaped aperture, a hub having projections for engaging said disk at said aperture with a tight fit, whereby to hold said cover to said disk, a flange formed on said hub for engaging said cover, an aperture formed in said hub for the projection of said cord, an aperture formed in said wall of the cover for stringing said electric cord therethrough, and outstanding ears formed on the periphery of said cover and cooperating with the protruding portion on said disk to aid in rotating said cover to wind and unwind the cord on said hub.

HUGO F. KELLER.

REFERENCES CITED

The following references are of record in the file of this patent:

UNITED STATES PATENTS

| Number | Name | Date |
| --- | --- | --- |
| 1,386,918 | Westrup et al. | Aug. 9, 1921 |
| 1,983,565 | Replogle | Dec. 11, 1934 |
| 2,406,874 | Walker | Sept. 3, 1946 |